United States Patent
Cho et al.

(10) Patent No.: US 9,104,276 B2
(45) Date of Patent: Aug. 11, 2015

(54) TOUCH SCREEN PANEL AND MANUFACTURING METHOD THEREOF

(75) Inventors: Se-Il Cho, Yongin (KR); Jae-Hyun Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1300 days.

(21) Appl. No.: 12/915,647

(22) Filed: Oct. 29, 2010

(65) Prior Publication Data

US 2011/0199320 A1    Aug. 18, 2011

(30) Foreign Application Priority Data

Feb. 18, 2010  (KR) ........................ 10-2010-0014754

(51) Int. Cl.
  *G06F 3/041*   (2006.01)
  *G06F 3/044*   (2006.01)
  *H01L 21/02*   (2006.01)
(52) U.S. Cl.
  CPC ..................................... *G06F 3/044* (2013.01)
(58) Field of Classification Search
  CPC ........................................... G06F 2203/04111
  USPC ................................................... 345/173–175
  See application file for complete search history.

(56) References Cited

U.S. PATENT DOCUMENTS

| | | | |
|---|---|---|---|
| 5,648,642 A | 7/1997 | Miller et al. | |
| 7,808,255 B2 * | 10/2010 | Hristov et al. | 324/686 |
| 8,289,296 B2 * | 10/2012 | Jeong et al. | 345/174 |
| 8,416,209 B2 * | 4/2013 | Hotelling et al. | 345/173 |
| 8,593,410 B2 * | 11/2013 | Hong et al. | 345/173 |
| 2006/0066581 A1 * | 3/2006 | Lyon et al. | 345/173 |

(Continued)

FOREIGN PATENT DOCUMENTS

| | | |
|---|---|---|
| JP | 2007-018226 A | 1/2007 |
| JP | 2007-323650 A | 12/2007 |

(Continued)

OTHER PUBLICATIONS

KIPO Office action dated Jun. 27, 2011 in the priority Korean application No. 10-2010-0014754, 3 pps.

(Continued)

*Primary Examiner* — Kumar Patel
*Assistant Examiner* — Sejoon Ahn
(74) *Attorney, Agent, or Firm* — Christie, Parker & Hale, LLP (57) ABSTRACT

A touch screen panel includes odd-numbered row transparent sensing cells formed of a transparent electrode on odd-numbered rows in a touch screen active area. Even-numbered row transparent sensing cells are formed of a transparent electrode on even-numbered rows in the same layer as the odd-numbered row transparent sensing cells. Odd-numbered row metal lines and even-numbered row main lines are formed of a metal in a position detecting line area positioned at a periphery of the touch screen active area, and which are respectively connected to the odd-numbered row transparent sensing cells and the even-numbered row transparent sensing cells. Bridges formed of a transparent electrode connect the even-numbered row main lines and the even-numbered row transparent sensing cells to each other with odd-numbered row main lines interposed therebetween, wherein the odd-numbered row main lines among the odd-numbered row metal lines are formed in parallel with the even-numbered row main lines.

16 Claims, 5 Drawing Sheets

(56) References Cited

U.S. PATENT DOCUMENTS

| | | | |
|---|---|---|---|
| 2007/0074914 A1* | 4/2007 | Geaghan et al. | 178/18.06 |
| 2007/0242054 A1* | 10/2007 | Chang et al. | 345/173 |
| 2008/0264699 A1* | 10/2008 | Chang et al. | 178/18.01 |
| 2009/0236151 A1* | 9/2009 | Yeh et al. | 178/18.03 |
| 2009/0262096 A1* | 10/2009 | Teramoto | 345/174 |
| 2009/0277695 A1* | 11/2009 | Liu et al. | 178/18.03 |
| 2010/0007616 A1* | 1/2010 | Jang | 345/173 |
| 2010/0026661 A1* | 2/2010 | Teramoto | 345/174 |
| 2010/0033443 A1* | 2/2010 | Hashimoto | 345/173 |
| 2010/0134436 A1 | 6/2010 | Jeong et al. | |
| 2010/0321043 A1* | 12/2010 | Philipp et al. | 324/686 |

FOREIGN PATENT DOCUMENTS

| | | |
|---|---|---|
| KR | 10-2009-0038863 A | 4/2009 |
| KR | 10-2010-0061993 | 6/2010 |

OTHER PUBLICATIONS

KIPO Office Action dated Nov. 29, 2011 for KR Application No. 10-2010-0014754 (1 page).

Machine English Translation of JP 2007-323650 A (41 pages).

* cited by examiner

TOUCH SCREEN PANEL AND MANUFACTURING METHOD THEREOF

CROSS-REFERENCE TO RELATED APPLICATION

This application claims the benefit of Korean Patent Application No. 10-2010-0014754, filed Feb. 18, 2010, in the Korean Intellectual Property Office, the disclosure of which is incorporated herein by reference.

BACKGROUND

1. Field

Aspects of the present invention relate to a touch screen panel and a manufacturing method thereof.

2. Description of the Related Art

A touch screen panel is an input device that allows a user's instruction to be inputted by a user's hand or object selecting an instruction content displayed on a screen such as an image display device. To this end, the touch screen panel is formed on a front face of the image display device to convert a contact position into an electrical signal. Here, the user's hand or object is directly in contact with the touch screen panel at the contact position. Accordingly, the instruction content selected at the contact position is inputted as an input signal to the image display device.

Since such a touch screen panel can be used instead of a separate input device connected to an image display device, such as a keyboard or mouse, use of the touch screen panel has increased. Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing cell and an adjacent sensing cell, ground electrode or the like, when a user's hand or object is in contact with the touch screen panel.

In the capacitive touch screen panel, the structure of electrodes is differently formed depending on a reading mode of a touch at a touch point on a touch screen panel. A mode used in touch screen panels is the mode in which a coordinate is calculated by separately forming electrodes on the X-axis and electrodes on the Y-axis. However, in the mode, hereinafter referred to as a 2 layer TSP, touch electrodes are necessarily formed into a two-layer structure. Hence, the 2 layer TSP has expensive unit cost and problems such as electrostatic discharge (ESD).

On the other hand, a method, hereinafter referred to as a 1 layer TSP, in which touch electrodes are formed into a one-layer structure, has inexpensive unit cost and a structure resilient to ESD. Therefore, the development of the 1 layer TSP has recently been advanced. The 1-layer TSP has difficulty in recognizing an X and Y coordinate when a multi-touch is inputted by a user. However, as the recognition for the multi-touch has recently been achieved with the development of algorithm technologies, it is expected that multi-touch applications will be increased.

A film-type 1 layer TSP can be easily manufactured into a simple structure having a two-layer silver interconnection separated into an indium tin oxide (ITO) electrode and an insulating layer is formed to calculate a touch position on the X-axis and Y-axis in a single layer. However, when a glass-type 1 layer TSP is manufactured by applying the manufacturing process of a thin film transistor, the manufacturing process necessarily goes through five mask processes, like the 2 layer TSP. This is because, in the glass-type 1 layer TSP, processes of forming metals are individually performed with an insulating layer interposed therebetween so as to form the two-layer interconnection separated in the film-type 1 layer TSP.

That is, the manufacturing process of a related art 1 layer TSP includes: forming a first electrode layer, having an even-numbered row metal electrode portion or odd-numbered row metal electrode portion, on a substrate using a first mask and covering the first electrode layer with an insulating layer; exposing a top of the first electrode layer using a second mask; forming a second electrode layer, having an odd-numbered row metal electrode portion or even-numbered row metal electrode portion, using a third mask; forming transparent electrodes (ITO) used as sensing cells, which are also referred to as touch electrodes, using a fourth mask and covering the transparent electrodes (ITO) with an insulating layer; and exposing position detecting lines formed at the outline of a touch active area in the touch screen panel using a fifth mask. Accordingly, the related art touch screen panel is manufactured using five masks.

However, the manufacture of masks increases development costs. Particularly, the number of masks is related to a manufacturing burden and complexity upon the manufacturing and processing department, and is linked directly to manufacturing cost. Accordingly, when touch screen panels are manufactured using the related art described above, a large number of masks are necessarily used. Therefore, manufacturing cost is increased, and processing efficiency is degraded.

SUMMARY

According to aspects of the present invention, there are provided a touch screen panel capable of being manufactured using a reduced number of masks and a manufacturing method thereof.

According to aspects of the present invention, there is provided a touch screen panel including odd-numbered row transparent sensing cells formed of a transparent electrode on odd-numbered rows in a touch screen active area so as to sense a touch of a user of the touch screen panel; even-numbered row transparent sensing cells formed of a transparent electrode on even-numbered rows in the same layer as the odd-numbered row transparent sensing cells so as to sense the touch; odd-numbered row metal lines formed of a metal in a position detecting line area, positioned at a periphery of the touch screen active area, the odd-numbered row metal lines being connected to the plurality of the odd-numbered row transparent sensing cells; even-numbered row main lines, formed of a metal in the position detecting line area positioned at the periphery of the touch screen active area, the even-numbered row main lines being connected to the plurality of even-numbered row transparent sensing cells; and bridges formed of a transparent electrode to connect the even-numbered row main lines and the even-numbered row transparent sensing cells to each other with odd-numbered row main lines interposed therebetween, wherein the odd-numbered row main lines among the odd-numbered row metal lines are formed in parallel with the even-numbered row main lines.

According to another aspect of the present invention, the odd-numbered row metal lines and the even-numbered row main lines may be formed in one layer, the bridges, the odd-numbered row transparent sensing cells and the even-numbered row transparent sensing cells may be formed in another layer different from the one layer in which the odd-numbered row metal lines and the even-numbered row main lines are formed and there may be an insulating layer between the one layer and the another layer.

According to another aspect of the present invention, the odd-numbered row metal lines may be connected to the odd-numbered row transparent sensing cells through odd-numbered row electrode portion contact holes formed in the insulating layer.

According to another aspect of the present invention, the bridges may be connected to the even-numbered row transparent sensing cells through even-numbered row metal electrode portions formed in the same layer as the even-numbered row main lines.

According to aspects of the present invention, there is provided a manufacturing method of a touch screen panel, which includes forming a plurality of even-numbered row main lines and a plurality of odd-numbered row metal lines, formed of a metal, on a substrate using a first mask; depositing an insulating layer on the substrate; forming a plurality of contact holes for exposing the odd-numbered row metal lines or even-numbered row main lines on the insulating layer using a second mask; depositing a transparent electrode layer on the insulating layer; forming a plurality of odd-numbered row transparent sensing cells, a plurality of even-numbered row transparent sensing cells, odd-numbered row transparent electrode portions connecting the odd-numbered row transparent sensing cells to the odd-numbered row metal lines and bridges connecting the even-numbered row transparent sensing cells to the even-numbered row main lines on the transparent electrode layer using a third mask; depositing a protection layer on the transparent electrode layer; and exposing interconnections connected to an external device in an external connection area using a fourth mask.

According to another aspect of the present invention, in the forming of the plurality of contact holes exposing the odd-numbered row metal lines or even-numbered row main lines on the insulating layer using the second mask, a plurality of odd-numbered row electrode portion contact holes exposing the odd-numbered row electrode portions among the odd-numbered row metal lines, connected to the odd-numbered row transparent sensing cells, and a plurality of even-numbered row main line contact holes exposing the plurality of even-numbered row main lines may be formed in the insulating layer.

According to another aspect of the present invention, in the forming of the plurality of contact holes exposing the odd-numbered row metal lines or even-numbered row main lines on the insulating layer using the second mask, even-numbered row metal electrode contact holes formed opposite to the even-numbered row main lines with the odd-numbered row metal lines interposed therebetween so as to expose even-numbered row metal electrode portions connected to the even-numbered row transparent sensing cells may be further formed in the insulating layer.

According to another aspect of the present invention, in the forming of the bridges using the third mask, the even-numbered row main lines exposed in the insulating layer and the even-numbered row transparent sensing cells may be connected to each other through the even-numbered row main line contact holes formed using the second mask.

According to another aspect of the present invention, the bridges may be connected to the even-numbered row transparent sensing cells through even-numbered row electrode portion contact holes exposing the even-numbered row metal electrode portions, formed opposite to the even-numbered row main lines with the odd-numbered row metal lines therebetween so as to be connected to the even-numbered row transparent sensing cells.

As described above, according to aspects of the present invention, a touch screen panel can be manufactured using four masks, the number of which is smaller by one than that of masks in the related art, thereby saving the cost of masks and reducing the load of a photolithography apparatus. Furthermore, as the number of masks is decreased by one, the number of metal deposition and metal etching processes is also decreased, thereby saving the entire cost of the touch screen panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is to be understood that where is stated herein that a first element is said to be disposed or formed or disposed "on" or "in" or "connected to" a second element, the first element can directly contact the second element, or can be separated from the second element by one or more other elements located therebetween. In contrast, when an element is referred to as being disposed or formed "directly on" or "directly connected to" another element, there are no intervening elements present.

Figure 1:
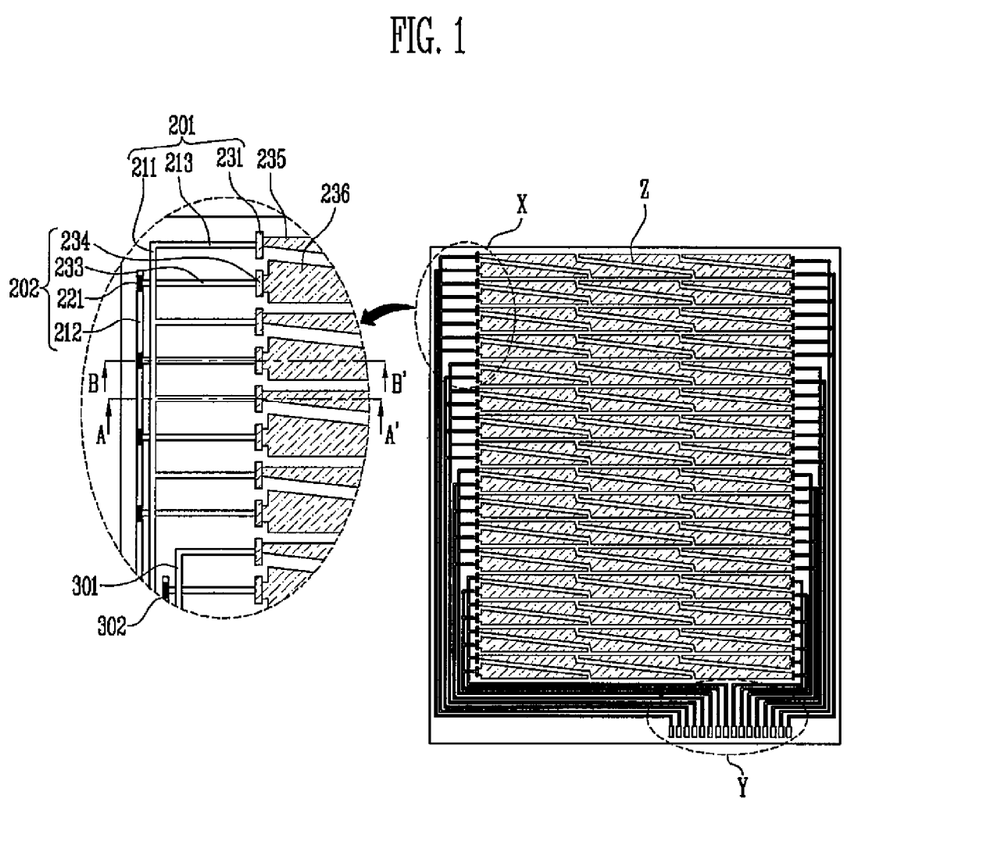
FIG. 1 is a plan view of a touch screen panel according to an embodiment of the present invention.

FIG. 1 is a plan view of a touch screen panel according to an embodiment of the present invention. Aspects of the present invention provide a method to manufacture the touch screen panel using four masks rather than to manufacture the related art touch screen panel using five masks. Accordingly, the main characteristics of aspects of the present invention will be briefly described as follows.

The touch screen panel, according to the present embodiment of the present invention, has a structure in which four X1 sensing cells 235, respectively arranged on odd-numbered rows 1, 3, 5 and 7, in a touch active area Z, which is also referred to as a display area. The four X1 sensing cells 235 are made as one group and connected to one another through a same metal line, hereinafter referred to as an odd-numbered row metal line. Four X2 sensing cells 236, respectively arranged on even-numbered rows 2, 4, 6 and 8, in the touch active area Z. The four X2 sensing cells 236 are made as one group and connected to one another through another same metal line, hereinafter referred to as an even-numbered row metal line. In the present embodiment of the present invention, the sensing cells 235, 236 are formed in various shapes including a triangular bar electrode shape. As the number of channels is increased, the number of metal lines fanned out to an exterior of the display area is increased, and hence, a dead space is increased. Therefore, the X1 and X2 sensing cells 235, 236 are made as one group so as to prevent the dead space from being increased. However, aspects of the present invention are not limited thereto, and the number of X1 and X2 sensing cells 235, 236 connected to one another through one same metal line may be varied.

That is, position detecting line area X of FIG. 1 shows an upper portion of the touch screen panel. Particularly, the position detecting line area X of FIG. 1 is shown by enlarging a portion of position detecting lines positioned at the outline of the touch active area Z. In the position detecting line area X, the four X1 sensing cells 235, respectively arranged on first, third, fifth and seventh rows, are connected to a first odd-numbered row metal line 201. The four X2 sensing cells 236, respectively arranged on second, fourth, sixth and eighth rows, are connected to a first even-numbered row metal line 202. Four X1 sensing cells 235, respectively arranged on a ninth row and eleventh, thirteenth and fifteenth rows (not shown) are connected to a second odd-numbered row metal line 301. The four X2 sensing cells 236, respectively arranged on a tenth row and twelfth, fourteenth and sixteenth rows (not shown), are connected to a second even-numbered row metal line 302.

Although not shown in the enlarged position detecting line area X, among sensing cells respectively arranged on rows posterior to the sixteenth row, four sensing cells are made as one group and connected to an odd-numbered row metal line or even-numbered row metal line according to the principles described above. That is, a plurality of odd-numbered row metal lines and a plurality of even-numbered row metal lines are formed in the touch screen panel according to the present embodiment of the present invention.

More specifically, the odd-numbered row metal line 201, which are connected to the X1 sensing cells 235, include odd-numbered row main lines 211, odd-numbered row connection lines 213 and odd-numbered row transparent electrode portions 231. The even-numbered row metal lines 202, which are connected to the X2 sensing cells 236, include even-numbered row main lines 212, even-numbered row electrode-portion contact holes 224 (e.g., even-numbered row metal electrode portion contact holes), bridges 233 and even-numbered row transparent electrode portions 234. The second odd-numbered row metal line 301 is connected to the four X1 sensing cells 235 respectively arranged on the ninth, eleventh, thirteenth and fifteenth rows as described above. The second even-numbered row metal line 302 is connected to the four X2 sensing cells 236 respectively arranged on the tenth, twelfth, fourteenth and sixteenth rows as described above.

In a touch screen panel having the structure describe above, a plurality of sensing cells, which are touch electrodes, are made as one group and connected to one odd-numbered row metal line or one even-numbered row metal line as described above. Hence, it is unavoidable that the odd-numbered row metal line and the even-numbered row metal line overlap or cross over each other. However, in the present embodiment of the present invention, the odd-numbered row metal line and the even-numbered row metal line are connected to each other through a bridge 233 using a transparent electrode (ITO) at a region in which the odd-numbered row metal line and the even-numbered row metal line are intersected with each other.

According to aspects of the present invention, a plurality of triangular bar electrodes, which are the touch electrodes or the X1 and X2 sensing cells 235, 236, are arranged in one layer. Here, some of the triangular bar electrodes are disposed so as to extend in rows in the X-axis direction and cross each other while facing each other, and are repeatedly disposed in columns in the Y-axis direction. In other words, the some of the triangular bar electrodes overlap each other as they extend in the X-direction because their shapes interlock but do not contact each other. However, aspects of the present invention are not limited to the X1 and X2 sensing cells 235, 236 having such a shape.

Hereinafter, processes of manufacturing the touch screen panel according to the present embodiment of the present invention, using four masks, will be described in detailed with reference to the accompanying drawings. The sectional views shown in the drawings discussed below are sectional views taken along lines A-A' and B-B' of FIG. 1. The line A-A' represents a portion of the touch screen panel obtained by cutting away a portion at which the first odd-numbered row metal line 201 and the first even-numbered row metal line 202 are not overlapped with each other. The line B-B' represents a portion of the touch screen panel obtained by cutting away a portion at which the first odd-numbered row metal line 201 and the first even-numbered row metal line 202 are overlapped with each other in different layers.

However, according to aspects of the present invention, odd-numbered row metal lines 201 and even-numbered row metal lines 202 are connected to X1. X2 sensing cells 235, 236, respectively, without overlapping each other in a same layer. The configurations and manufacturing methods of the other portions of the touch screen panel, e.g., an external connection area Y, and the like, can be identically applied to related arts. Therefore, the position detecting line area X will be mainly described hereinbelow.

As described above, odd-numbered row metal lines 201 and even-numbered row metal lines 202 are formed. The first of the odd-numbered row metal lines 201 and the first of the even-numbered row metal lines 202 will be mainly described hereinbelow. The metal lines 201, 202 other than the first metal lines 201, 202 are simultaneously formed with the first of the odd-numbered row metal line 201 and the first even-numbered row metal lines 202 using the same method. However, aspects of the present invention are not limited thereto, and the other metal lines 201, 202 may be formed separate from the first odd-numbered row metal line 201 and the first even-numbered row metal lines 202.

In the following descriptions, processes to form even-numbered row metal lines 202, odd-numbered row metal lines 201 and patterns of transparent electrodes, which are sensing cells 235, 236, such as a depositing process, an exposing process using a mask and an etching process, are previously known in the art. Therefore, detailed descriptions of general processes for forming patterns will be omitted hereinbelow.

Figure 2:
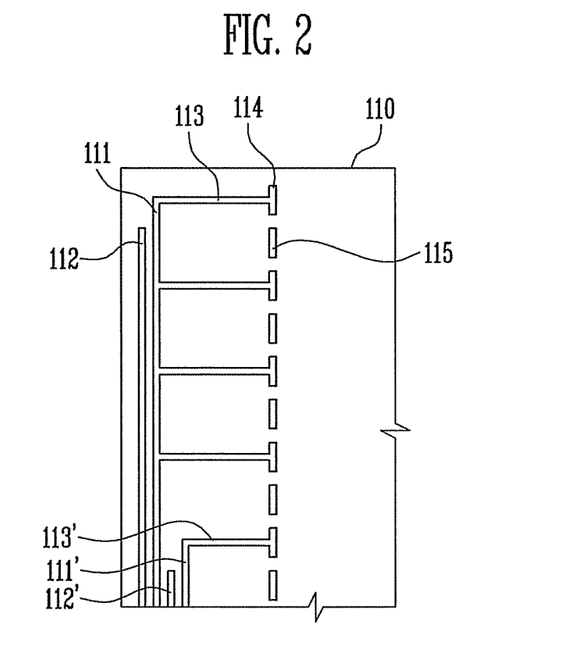
FIG. 2 is a plan view of a first mask applied to a manufacturing method of the touch screen panel according to the present embodiment of the present invention.
Figure 3:
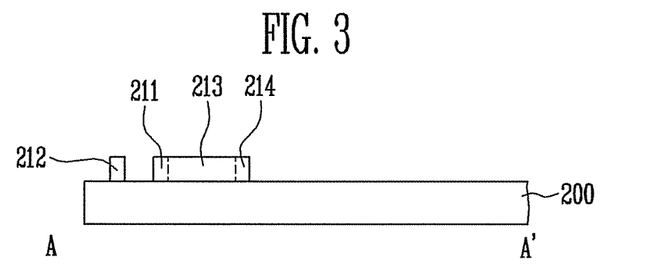
FIG. 3 is a sectional view taken along line A-A of the touch screen panel of FIG. 1 in which a metal line is formed using the first mask.
Figure 4:
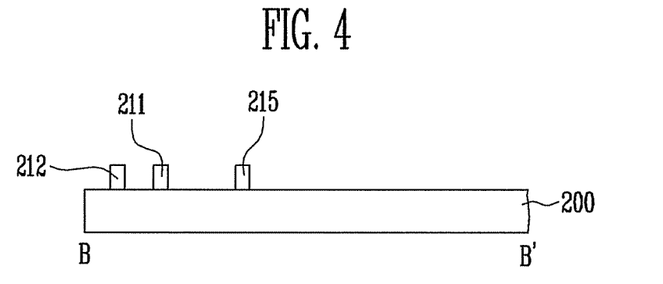
FIG. 4 is a sectional view taken along line B-B' of the touch screen panel of FIG. 1 in which a metal line is formed using the first mask.

FIG. 2 is a plan view of a first mask 110 applied to a manufacturing method of the touch screen panel according to the present embodiment of the present invention. FIG. 3 is a sectional view taken along line A-A' of the touch screen panel of FIG. 1 in which a metal line is formed using the first mask 110. FIG. 4 is a sectional view taken along line B-B' of the touch screen panel of FIG. 1 in which a metal line is formed using the first mask 110.

In order to manufacture the touch screen panel according to the embodiment of the present invention, even-numbered row main lines 212, odd-numbered row metal lines 201, having the odd-numbered row main lines 211, the odd-numbered row connection lines 213 and the odd-numbered row metal electrode portions 214, and even-numbered row metal electrode portions 215 are first formed on a substrate 200. The even-numbered row main lines 212 of the even-numbered row metal lines 202 extend in parallel with the odd-numbered row main lines 211 of the odd-numbered row metal lines 201 in the Y-axis direction of the substrate 200.

The odd-numbered row metal lines 201 are connected to the X1 sensing cells 235 on odd-numbered rows as described above. The entire shape, including elements 211, 213 and 214, of the odd-numbered row metal lines 201 are formed on the substrate 200 using the first mask 110. That is, the entirety of the odd-numbered row metal lines 201, the odd-numbered row main lines 211, the odd-numbered row connection lines 213 and the odd-numbered row metal electrode portions 214 in the odd-numbered row metal lines 201 are formed on the same plane of the substrate 200 using the first mask 110. Also, the even-numbered row main lines 212 and the even-numbered row metal electrode portions 215 in the even-numbered row metal lines 202 are formed on the same plane of the substrate 200 using the first mask 110.

Thus, with respect to FIG. 3, when viewing the touch screen panel formed using the first mask 110, as viewed along the line A-A' of FIG. 1, the even-numbered row main lines 212, the odd-numbered row main lines 211, the odd-numbered row connection lines 213 and the odd-numbered row metal electrode portions 214 are formed on the same plane. With respect to FIG. 4, when viewing the touch screen panel formed using the first mask 110, as viewed along the line B-B' of FIG. 1, the even-numbered row main lines 212, the odd-numbered row main lines 211 and the even-numbered row metal electrode portions 215 are formed on the same plane. The patterns described above are formed using the first mask 110 shown in FIG. 2.

With reference to FIG. 2, even-numbered row main line marking portions 112, odd-numbered row main line marking portions 111, odd-numbered row connection line marking portions 113, odd-numbered row metal electrode marking portions 114 and even-numbered row metal electrode marking portions 115 are formed in the first mask 110. The even-numbered row main line marking portions 112, the odd-numbered row main line marking portions 111, the odd-numbered row connection line marking portions 113, the odd-numbered row metal electrode marking portions 114 and the even-numbered row metal electrode marking portions 115 are respectively matched to the even-numbered row main lines 212, the odd-numbered row main lines 211, the odd-numbered row connection lines 213, the odd-numbered row metal electrode portions 214 and the even-numbered row metal electrode portions 215.

Although not shown in FIG. 2, main line marking portions may be included in the first mask 110 to form odd-numbered row main lines 211 and even-numbered row main lines 212, configured as described above, at a portion of the touch screen panel corresponding to an external connection area Y, as shown in FIG. 1.

Figure 5:
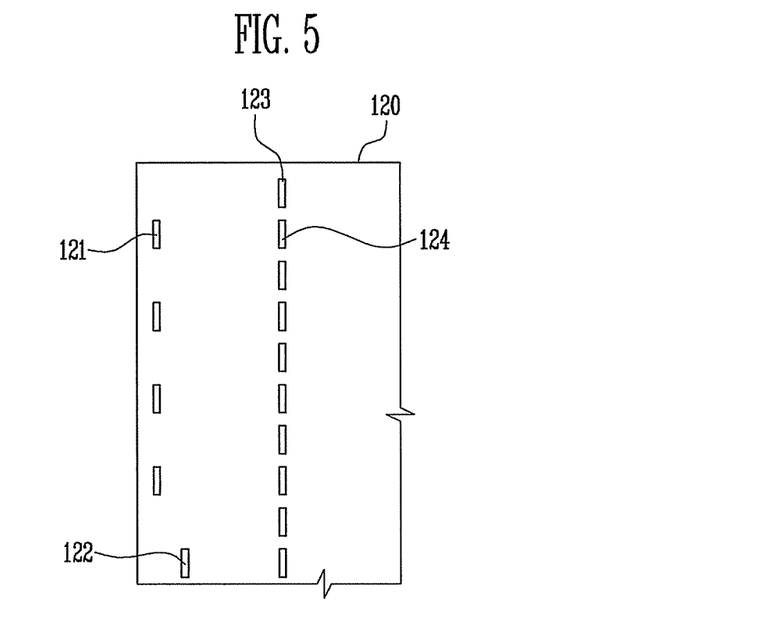
FIG. 5 is a plan view of a second mask applied to the manufacturing method of the touch screen panel according to the present embodiment of the present invention.
Figure 6:
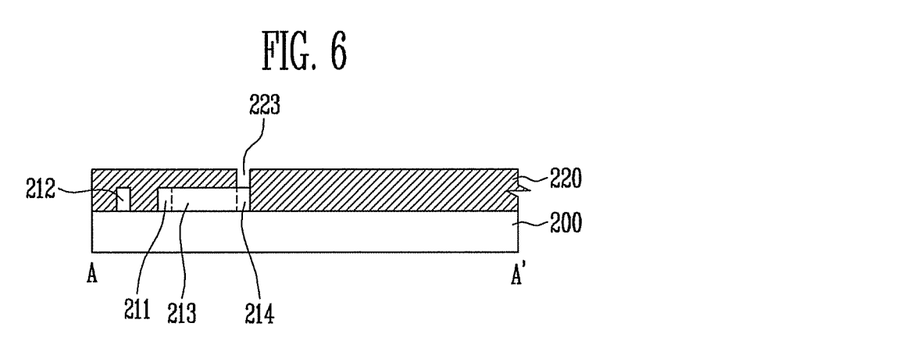
FIG. 6 is a sectional view taken along line A-A' of the touch screen panel of FIG. 1 in which an odd-numbered row electrode-portion contact hole is formed using the second mask.
Figure 7:
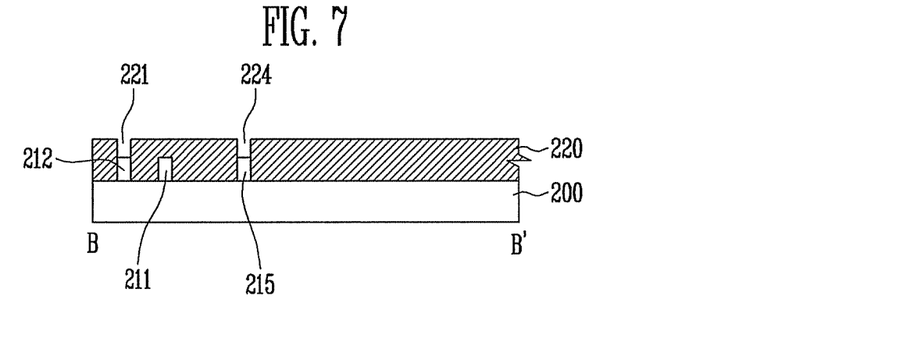
FIG. 7 is a sectional view taken along line B-B' of the touch screen panel of FIG. 1 in which an even-numbered row main-line contact hole and an even-numbered row electrode-portion contact hole are formed using the second mask.

FIG. 5 is a plan view of a second mask 120 applied to the manufacturing method of the touch screen panel according to the present embodiment of the present invention. FIG. 6 is a sectional view, taken along line A-A' of the touch screen panel of FIG. 1, illustrating odd-numbered row electrode-portion contact holes 223 formed using the second mask 120. FIG. 7 is a sectional view, taken along line B-B' of the touch screen panel of FIG. 1, illustrating even-numbered row main-line contact holes 221 and an even-numbered row electrode-portion contact holes 224 formed using the second mask 120.

Before using the second mask 120, an insulating layer 220 is deposited on the substrate 200 on which the plurality of patterns are formed as shown in FIGS. 3 and 4. After the insulating layer 220 is deposited, the odd-numbered row electrode portion contact holes 223, the even-numbered row main line contact holes 221 and the even-numbered row electrode portion contact holes 224 are formed in the insulating layer 220 using the second mask 120.

Thus, with reference to FIG. 6, when viewing the touch screen panel formed using the second mask 120, viewed along the line A-A' of FIG. 1, the odd-numbered row metal electrode portion contact holes 223 are formed on the top of the odd-numbered row metal electrode portions 214. With reference to FIG. 7, when viewing the touch screen panel formed using the second mask 120, viewed along the line B-B' of FIG. 1, the even-numbered row main line contact holes 221 are formed on the top of the even-numbered row main lines 212, and the even-numbered row electrode portion contact holes 224 are formed on the top of the even-numbered row metal electrode portions 215.

Meanwhile, the patterns described above are formed using the second mask 120 shown in FIG. 5. To this end, odd-numbered row electrode portion contact hole marking portions 123, even-numbered row main line contact hole marking portions 121 and 122, and even-numbered row electrode portion contact hole marking portions 124 are formed in the second mask. Here, the odd-numbered row electrode portion contact hole marking portions 123, the even-numbered row main line contact hole marking portions 121 and 122 and the even-numbered row electrode portion contact hole marking portions 124 are respectively matched to the odd-numbered row electrode portion contact holes 223, the even-numbered row main line contact holes 221 and the even-numbered row electrode portion contact holes 224.

Although not shown in FIG. 5, a plurality of contact hole marking portions may be included in the second mask 120 at a portion corresponding to the external connection area Y of the touch screen panel so that the plurality of odd-numbered row main line and the plurality of even-numbered row metal lines, configured as described above, can be exposed.

Figure 8:
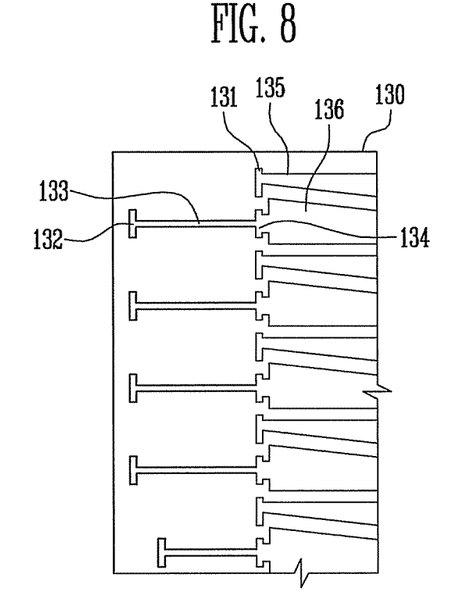
FIG. 8 is a plan view of a third mask applied to the manufacturing method of the touch screen panel according to the present embodiment of the present invention.
Figure 9:
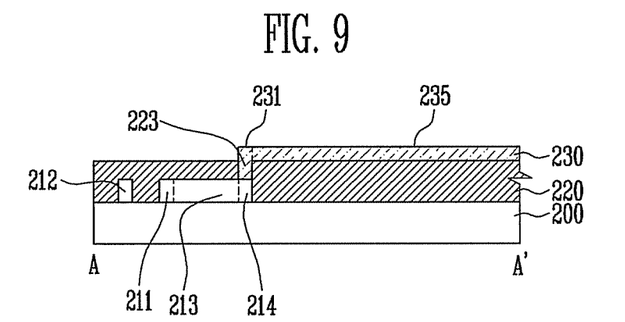
FIG. 9 is a sectional view taken along line A-A' of the touch screen panel of FIG. 1 in which an odd-numbered row transparent sensing cell and an odd-numbered row transparent electrode portion are formed using the third mask.
Figure 10:
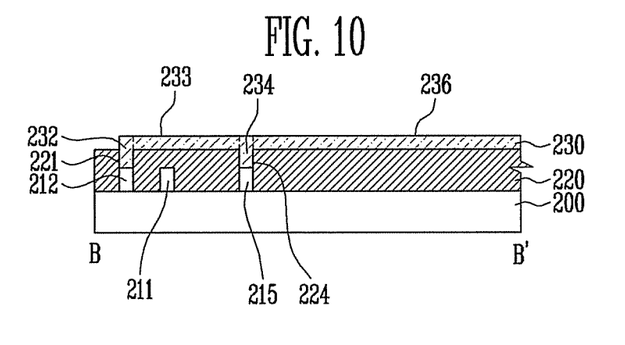
FIG. 10 is a sectional view taken along line B-B' of the touch screen panel of FIG. 1 in which a bridge is formed using the third mask.

FIG. 8 is a plan view of a third mask applied to the manufacturing method of the touch screen panel according to the embodiment of the present invention. FIG. 9 is a sectional view taken along line A-A' of the touch screen panel of FIG. 1 in which odd-numbered row transparent sensing cells 235 and odd-numbered row transparent electrode portions 231 are formed using the third mask 130. FIG. 10 is a sectional view taken along line B-B' of the touch screen panel of FIG. 1 in which a bridge 233 is formed using the third mask.

Before using the third mask 130, a transparent electrode layer 230 is deposited on the substrate 200 having the contact holes formed using the second mask 120 as described FIGS. 6 and 7. After the transparent electrode 230 is deposited, the odd-numbered row transparent electrode portions 231, odd-numbered row transparent sensing cells 235, even-numbered row main line transparent electrodes 232, bridges 233, even-numbered row transparent electrode portions 234 and even-numbered row transparent sensing cells 236 are formed using the third mask 130.

Thus, with reference to FIG. 9, when viewing the touch screen panel formed using the third mask 120 along the line A-A' of FIG. 1, the odd-numbered row transparent electrode portions 231 are formed in the odd-numbered row electrode portion contact holes 223, and the odd-numbered row transparent sensing cells 235 are formed in the touch active area Z and are connected to the odd-numbered row transparent electrode portions 231.

With reference to FIG. 10, when viewing the touch screen panel formed using the third mask 120 along the line B-B' of FIG. 1, the even-numbered row main line transparent electrodes 232 are formed in the even-numbered row main line contact holes 221. Also, the even-numbered row transparent electrode portions 234 are formed in the even-numbered row electrode-portion contact holes 224 (e.g., even-numbered row metal electrode portion contact holes). The even-numbered row transparent sensing cells 236 in the touch active area Z are connected to the even-numbered row transparent electrode portions 234 and the even-numbered row transparent electrodes 232 through the bridges 233. That is, as described above, the even-numbered row transparent electrode sensing cells 236, which are formed with the transparent electrode, are electrically connected to the even-numbered row main lines 212 so that they are isolated from the odd-numbered row main lines 211 through the bridges 233 which are formed with the transparent electrode. The patterns described above are formed using the third mask 130 shown in FIG. 8.

To this end, odd-numbered row transparent sensing cell marking portions 135, even-numbered row transparent sensing cell marking portions 136, odd-numbered row transparent electrode marking portions 131, even-numbered row transparent electrode marking portions 134, bridge marking portions 133 and even-numbered row main line transparent electrode marking portions 132 are formed in the third mask 130. The odd-numbered row transparent sensing cell marking portions 135, the even-numbered row transparent sensing cell marking portions 136, the odd-numbered row transparent electrode marking portions 131, the even-numbered row transparent electrode marking portions 134, the bridge marking portions 133 and the even-numbered row main line transparent electrode marking portions 132 are respectively matched to the odd-numbered row transparent sensing cells 235, the even-numbered row transparent sensing cells 236, the odd-numbered row transparent electrode portions 231, the even-numbered row transparent electrode portions 234, the bridges 233 and the even-numbered row main line transparent electrodes 232.

The odd-numbered row transparent sensing cells 235 and the even-numbered row transparent sensing cells 236 are used to sense a touch. The odd-numbered row transparent sensing cell 235 and the even-numbered row transparent sensing cell 236 are collectively referred to as touch electrodes. Although not shown in FIG. 8, the third mask 130 may include transparent electrode marking portions to form a transparent electrodes at the contact hole marking portions formed through the second mask 120 at a portion of the touch screen panel corresponding to the external connection area Y.

When touch electrodes are formed in one layer in a general touch screen panel, lead interconnections, which are even-numbered row metal lines and odd-numbered row metal lines, of patterns increasing the accuracy of sensing are formed of two-layer metals with an insulating layer interposed therebetween. In contrast, according to aspects of the present invention, lead interconnections are formed in one layer by the bridges 233 using the transparent electrode layer 230.

In the present embodiment of the present invention, transparent electrodes used as the transparent electrode layer 230 are formed of an oxide film such as indium tin oxide (ITO) or indium zinc oxide (IZO) and a transparent conductive organic material such as carbon nanotubes (CNT). However, aspects of the present invention are not limited thereto and other suitable materials may be used for the transparent electrode layer 230. As described above, the X1, X2 sensing cells 235, 236 are formed in a triangular bar electrode shape. However, aspects of the present invention are not limited thereto and the X1, X2 sensing cells 235, 236 may be formed in various shapes.

Figure 11:
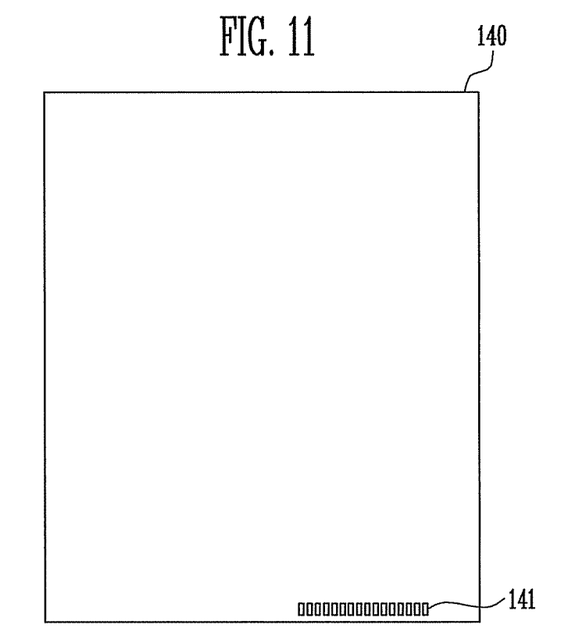
FIG. 11 is a plan view of a fourth mask applied to the manufacturing method of the touch screen panel according to the present embodiment of the present invention.
Figure 12:
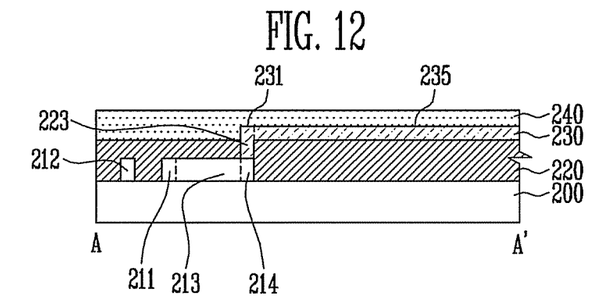
FIG. 12 is a sectional view taken along line A-A of the touch screen panel of FIG. 1 formed using the fourth mask.
Figure 13:
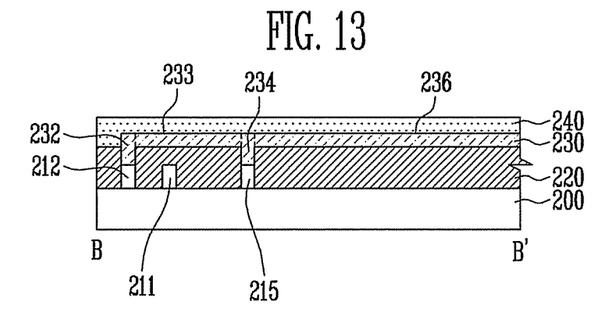
FIG. 13 is a sectional view taken along line B-B' of the touch screen panel of FIG. 1 formed using the fourth mask.

FIG. 11 is a plan view of a fourth mask 140 applied to the manufacturing method of the touch screen panel according to the present embodiment of the present invention. FIG. 12 is a sectional view taken along line A-A' of the touch screen panel of FIG. 1 formed using the fourth mask 140. FIG. 13 is a sectional view taken along line B-B' of the touch screen panel of FIG. 1 formed using the fourth mask 140. Before using the fourth mask 140, a protection layer 240 is deposited on the substrate 200 having the transparent X1, X2 sensing cells 235 and 236 formed thereon using the third mask 130 as shown in FIGS. 9 and 10.

After the protection layer 240 is deposited on the substrate 200, interconnection contact holes (not shown) are formed in the external connection area Y using the fourth mask 140 shown in FIG. 11. That is, the interconnection contact holes are formed in the protection layer 240 in order to connect the odd-numbered row main lines 201, the even-numbered row main lines 202 or the transparent sensing cells 235, 236, all of which are collectively referred to as interconnections hereinafter, extended to the external connection area Y, to an external device. The external device may be a capacitive sensor chip analyzing a position touched by a user based on sensing information transmitted from sensing cells. Such a portion of the interconnection contact holes is also referred to as an exposure portion.

Thus, with reference to FIG. 12, when viewing the touch screen panel formed using the fourth mask 140 along the line A-A' of FIG. 1, the protection layer 240 is formed on the touch screen panel shown in FIG. 9. With reference to FIG. 13, when viewing the touch screen panel formed using the fourth mask 140 along the line B-B' of FIG. 1, the protection layer 240 is formed on the touch screen panel shown in FIG. 10. That is, the position detecting line area X has no new pattern formed therein, and is covered by the protection layer 240. As described above, in the external connection area Y, the interconnection contact holes are formed in the protection layer 240 in order to expose the interconnections connected to the exterior.

The interconnection contact holes formed in the external connection area are formed using the fourth mask 140. Interconnection contact hole marking portions 141 respectively matched to the interconnection contact holes are formed at a portion corresponding to the interconnection contact holes in the external connection area Y of the touch screen panel in the fourth mask 140. The touch screen panel manufactured through the processes described above has a structure including one metal layer formed with the odd-numbered row main lines 211 and the even-numbered row main lines 212 and one transparent electrode layer 230 forming the sensing cells 235, 236.

In contrast to aspects of the present invention, the related art touch screen panel will be described. When a metal layer and a transparent electrode layer are formed, they are formed through subsequent processes. On the other hand, according to aspects of the present invention, the even-numbered row main lines 212 in the metal layer and the transparent electrodes are connected by the bridges 233 formed of the transparent electrode (ITO). Thus, according to aspects of the present invention, the structure having two metal layers can be implemented using only one metal layer.

That is, according to aspects of the present invention, the interconnection, or bridge 233, is formed only at the front portion of the position at which the even-numbered row main line 212 intersects with the odd-numbered row main line 211 and is bridge-connected to the sensing cell at the intersection portion using the transparent electrode in one metal layer. Thus, another metal layer is not used.

More specifically, in the 1 layer touch screen panel manufactured using the related art method, the reason why the metal interconnections (odd-numbered row main lines and even-numbered row main lines) are formed in two layers is that they intersect with each other. In contrast, according to aspects of the present invention that overcome such problems, the metal interconnections are formed in one layer, and the connection portion, or bridges 233, of the even-numbered row main lines 212 to be connected to the X2 sensing cells 236 while intersecting with the odd-numbered row main lines 211 is formed in a bridge shape using the transparent electrode through the same process as that of the X1, X2 sensing cells 235, 236.

At this time, a large-area contact is required to reduce contact resistance, and therefore, the area of the contact is as wide as its design requires. Meanwhile, according to aspects of the present invention, the transparent electrode forming the sensing cells 235, 236 in the touch active area can use the maximum area of the metal that contacts the odd-numbered row metal line 201 and the even-numbered row metal line 202.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A touch screen panel comprising:
   odd-numbered row transparent sensing cells formed of a transparent electrode on odd-numbered rows in a touch screen active area so as to sense a touch of a user of the touch screen panel;
   even-numbered row transparent sensing cells formed of a transparent electrode on even-numbered rows in a same layer as the odd-numbered row transparent sensing cells so as to sense the touch;
   odd-numbered row metal lines, formed of a metal at a position detecting line area, positioned at a periphery of the touch screen active area, the odd-numbered row metal lines being connected to the odd-numbered row transparent sensing cells;
   even-numbered row main lines, formed of a metal at the position detecting line area, positioned at the periphery of the touch screen active area, the even-numbered row main lines being connected to the even-numbered row transparent sensing cells; and
   bridges formed of a transparent electrode to connect the even-numbered row main lines and the even-numbered row transparent sensing cells to each other with odd-numbered row main lines positioned between the even-numbered row main lines and the even-numbered row transparent sensing cells and at a different layer from the bridges, wherein the odd-numbered row main lines among the odd-numbered row metal lines are formed in parallel with the even-numbered row main lines, wherein the odd-numbered row metal lines and the even-numbered row main lines are formed at one layer, wherein the bridges, the odd-numbered row transparent sensing cells and the even-numbered row transparent sensing cells are formed at another layer different from the one layer at which the odd-numbered row metal lines and the even-numbered row main lines are formed, and wherein there is an insulating layer between the one layer and the another layer.

2. The touch screen panel according to claim 1, wherein the odd-numbered row metal lines are connected to the odd-numbered row transparent sensing cells through odd-numbered row electrode portion contact holes formed in the insulating layer.

3. The touch screen panel according to claim 1, wherein the bridges are connected to the even-numbered row transparent sensing cells through even-numbered row metal electrode portions formed at a same layer as the even-numbered row main lines.

4. A manufacturing method of a touch screen panel, comprising: forming a plurality of even-numbered row main lines and a plurality of odd-numbered row metal lines, formed of a metal, on a substrate using a first mask; depositing an insulating layer on the substrate;
   forming a plurality of contact holes exposing the odd-numbered row metal lines or even-numbered row main lines on the insulating layer using a second mask;
   depositing a transparent electrode layer on the insulating layer;
   forming a plurality of odd-numbered row transparent sensing cells, a plurality of even-numbered row transparent sensing cells, odd-numbered row transparent electrode portions connecting the odd-numbered row transparent sensing cells to the odd-numbered row metal lines and bridges connecting the even-numbered row transparent sensing cells to the even-numbered row main lines on the transparent electrode layer using a third mask;
   depositing a protection layer on the transparent electrode layer; and
   exposing interconnections connected to an external device in an external connection area using a fourth mask,
   wherein, in the forming of the bridges using the third mask, the even-numbered row main lines exposed in the insulating layer and the even-numbered row transparent sensing cells are connected to each other through even-numbered row main line contact holes formed using the second mask, and wherein the bridges are connected to the even-numbered row transparent sensing cells through even-numbered row electrode portion contact holes exposing even-numbered row metal electrode portions, formed opposite to the even-numbered row main lines with the odd-numbered row metal lines therebetween so as to be connected to the even-numbered row transparent sensing cells.

5. The manufacturing method according to claim 4, wherein, in the forming of the plurality of contact holes exposing the odd-numbered row metal lines or even-numbered row main lines on the insulating layer using the second mask, a plurality of odd-numbered row electrode portion contact holes exposing the odd-numbered row electrode portions among the odd-numbered row metal lines, connected to the odd-numbered row transparent sensing cells, and the even-numbered row main line contact holes exposing the plurality of even-numbered row-main lines are formed in the insulating layer.

6. The manufacturing method according to claim 5, wherein, in the forming of the plurality of contact holes exposing the odd-numbered row metal lines or even-numbered row main lines on the insulating layer using the second mask, even-numbered row metal electrode contact holes, formed opposite to the even-numbered row main lines with the odd-numbered row metal lines interposed therebetween so as to expose the even-numbered row metal electrode portions connected to the even-numbered row transparent sensing cells, are further formed in the insulating layer.

7. A touch screen panel comprising:
a touch screen active area, comprising:
first transparent sensing cells disposed in first rows in the touch screen active area and formed of a transparent electrode; and
second transparent sensing cells disposed in second rows in the touch screen active area so as to alternate in a column direction with the first rows of the first transparent sensing cells and formed of a transparent electrode;
a position detecting line area, comprising: first metal lines connected to the first transparent sensing cells, the first metal lines comprising:
first metal electrode portions connected to the first transparent sensing cells;
first connection lines connected to the first metal electrode portions and extending in a row direction in parallel with the first metal electrode portions; and
first main lines connected to the first connection lines and extending in a direction perpendicular to the row direction of the first connection lines;
second metal lines connected to the second transparent sensing cells, the second metal lines comprising:
second metal electrode portions connected to the second transparent sensing cells;
bridges connected to the second metal electrode portions at a periphery of the touch screen active area, and extending in a row direction in parallel with the second metal electrode portions; and
second main lines connected to the bridges and extending in a direction perpendicular to the row direction of second connection lines; and
an external connection area having exposed interconnections connected to the first main lines and the second main lines, wherein the bridges are formed of a same transparent electrode as the first transparent sensing cells and the second transparent sensing cells, wherein the first metal lines and the second metal lines are formed at one layer, and wherein the bridges, the first transparent sensing cells, and the second transparent sensing cells are formed at another layer different from the one layer at which the first metal lines and the second main lines are located.

8. The touch screen panel of claim 7, wherein the first metal lines correspond to odd numbered rows of first transparent sensing electrodes and the second main lines correspond to even numbered rows of second transparent sensing electrodes, and wherein there is an insulating layer between the one layer and the another layer.

9. The touch screen panel of claim 8, wherein the first metal lines are connected to the first transparent sensing cells through first electrode portion contact holes formed in the insulating layer.

10. The touch screen panel of claim 8, wherein the bridges are connected to the second transparent sensing cells through the second metal electrode portions formed in a same layer as the first main lines.

11. A touch, screen panel including a touch screen active area having first transparent sensing cells disposed in first rows and second transparent sensing cells disposed in second rows, an external connection area and a position detecting line area, the position detecting line area comprising:
first metal lines connected to the first transparent sensing cells, the first metal lines comprising: first metal electrode portions connected to the first transparent sensing cells; first connection lines connected to the first metal electrode portions and extending in a row direction in parallel with the first metal electrode portions; and
first main lines connected to the first connection lines and extending in a direction perpendicular to the row direction of the first connection lines; and
second metal lines connected to the second transparent sensing cells, the second metal lines comprising: second metal electrode portions connected to the second transparent sensing cells; bridges connected to the second metal electrode portions at a periphery of the touch screen active area, and extending in a row direction in parallel with the second metal electrode portions; and second main lines connected to the bridges and extending in a direction perpendicular to the row direction of second connection lines, wherein the first transparent sensing cells, the second transparent sensing cells and the bridges are formed of a same transparent electrode, wherein the first main lines are positioned between the second row main lines and the second row transparent sensing cells, wherein the first metal lines and the second metal lines are formed at one layer, and wherein the bridges, the first transparent sensing cells and the second transparent sensing cells are formed at another layer different from the one layer at which the first metal lines and the second main lines are located.

12. The touch screen panel of claim 11, wherein the first transparent sensing cells are disposed in first rows in the touch screen active area,
wherein the second transparent sensing cells are disposed in second rows in the touch screen active area so as to alternate in a column direction with the first rows of first transparent sensing cells,
wherein the first metal lines correspond to odd numbered rows of first transparent sensing electrodes and the second main lines correspond to even numbered rows of second transparent sensing electrodes.

13. The touch screen panel of claim 11, wherein the external connection area comprises exposed interconnections connected to the first main lines and the second main lines.

14. The touch screen panel of claim 11, wherein there is an insulating layer between the one layer and the another layer.

15. The touch screen panel of claim 11, wherein the first metal lines are connected to the first transparent sensing cells through first electrode portion contact holes formed in an insulating layer.

16. The touch screen panel of claim 11, wherein the bridges are connected to the second transparent sensing cells through the second metal electrode portions formed at a same layer as the first main lines.

* * * * *